Dec. 21, 1943.  K. L. FINLEY ET AL  2,337,157
CRANKSHAFT CONSTRUCTION
Filed June 4, 1942
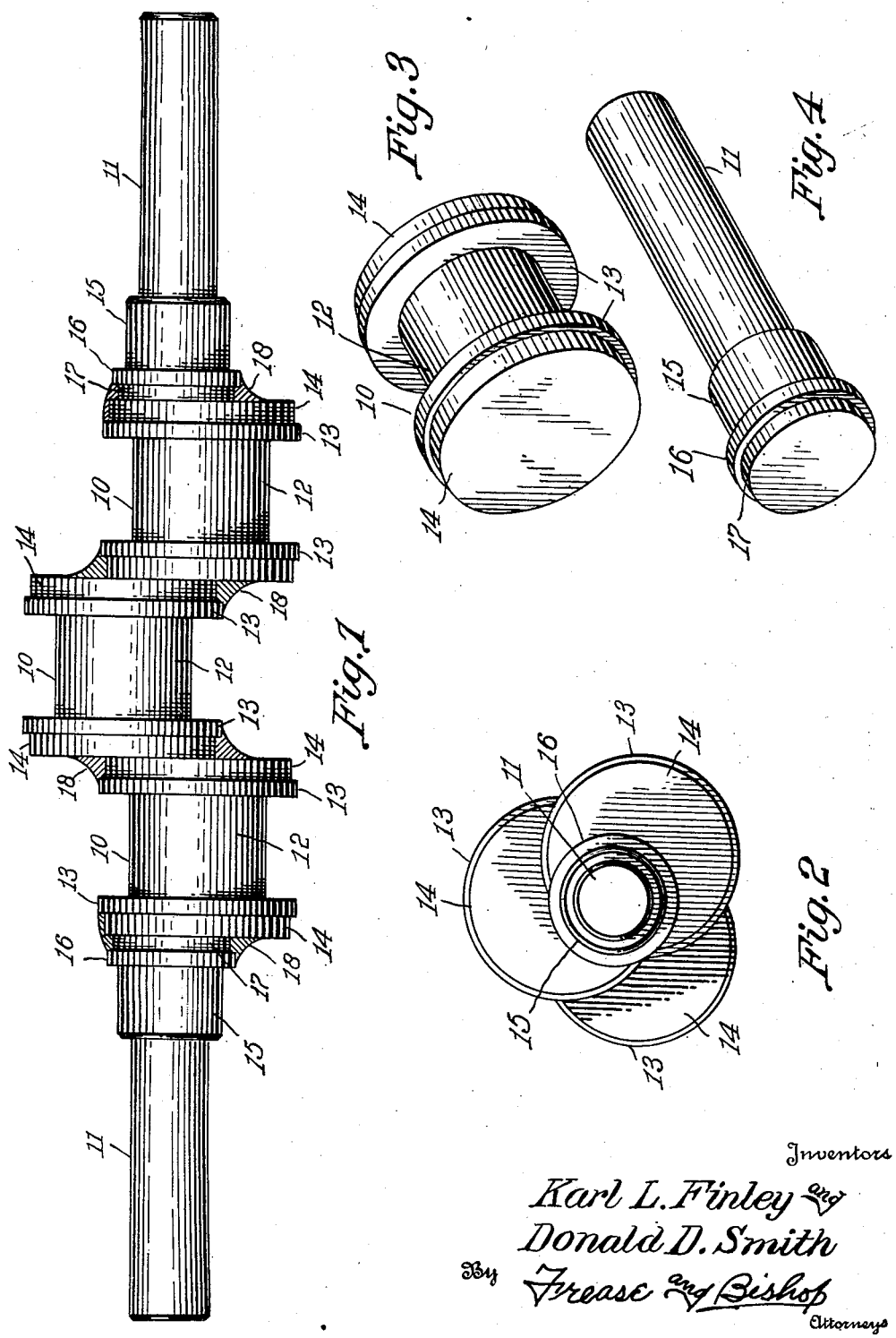
Inventors
Karl L. Finley and
Donald D. Smith
By Frease and Bishop
Attorneys Patented Dec. 21, 1943

2,337,157

UNITED STATES PATENT OFFICE 2,337,157

CRANKSHAFT CONSTRUCTION

Karl L. Finley and Donald D. Smith, Ashland, Ohio, assignors to The F. E. Myers & Bro. Co., Ashland, Ohio, a corporation of Ohio Application June 4, 1942, Serial No. 445,753

6 Claims. (Cl. 74—597)

The invention relates to crankshafts and more particularly to a crankshaft built up of a number of separate parts.

Crankshafts are ordinarily forged in a single piece in dies which are quite expensive to make and which have a limited life owing to the rough usage to which they are subjected in the drop forging operation.

Such forged crankshafts are usually purchased by the average machinery manufacturer from a drop forging manufacturer at the price and convenience of the latter, Government ratings at present being a serious consideration.

The present invention contemplates the construction of a crankshaft from a plurality of similar parts which may be machined from stock bar steel, then clamped together end to end in the requisite positions, in a suitable jig, and welded together to form a complete crankshaft which then requires only slight machining to finish the same.

These simple machined parts may be machined to substantially finished form, except for the final finish grinding, and hardened by heat treating, before being welded together into an assembly to form the completed crankshaft.

It is therefore an object of the invention to provide a crankshaft built up of a plurality of similar separate integral machined parts welded together in proper position to form a crankshaft.

Another object is to provide a crankshaft built up of a plurality of similar, separate, integral spools and two similar end shaft members having flanges at their ends, each spool forming a crank pin or journal portion and halves of two crank cheeks, the end shaft members forming main journals and halves of crank cheeks, the parts being placed together end to end in proper position and weld material being placed around the adjoining flanges of the several parts.

A further object of the improvement is to provide a crankshaft of this character in which practically all of the machining may be completed before the parts are welded together.

A still further object is the construction of such a crankshaft in which all, or any desired portion, of the separate machined parts may be heat treated before they are welded together.

Another object of the invention is the construction of a crankshaft of the character referred to in which the hardened surfaces of the parts may be cooled during the welding operation to conduct away the welding heat.

The above objects together with others which will be apparent from the drawing and following description or which may be later referred to, may be attained by constructing the improved crankshaft in the manner hereinafter described in detail.

Although crankshafts of various sizes and types, suitable for use in many kinds of machines, may be constructed in accordance with the invention, for the purpose of illustration a crankshaft is shown having three crank throws and two main journals and especially intended for use in a pump operating under high pressures, or in any machine with a similar application for a crankshaft.

In the drawing Figure 1 is an elevation of a crankshaft constructed in accordance with the invention, parts being broken in section for the purpose of illustration.

Fig. 2, an end elevation of the crankshaft shown in Fig. 1;

Fig. 3, a perspective view of one of the spools forming a complete pin or journal portion and halves of two crank cheeks, and Fig. 4, a perspective view of one of the end shaft members forming one complete main journal and one-half of a crank cheek.

Similar numerals refer to similar parts throughout the drawing.

In constructing a crankshaft in accordance with the invention a plurality of similar spools indicated generally at 10, and two end shaft members indicated generally at 11 are formed in any suitable way preferably by machining from stock bar steel on an ordinary engine lathe.

As above stated these parts may be machined to substantially the desired finished dimensions, practically all of the machining being completed before th eparts are joined together, so that after the several parts have been welded together, as will be later described in detail, in a welding jig which holds them accurately in the proper positions, it is only necessary to remove a slight amount of material from the crank pins, as by grinding.

The number of spools 10 will vary depending upon the number of crank throws required in the crankshaft. Each spool comprises a pin or journal portion 12 and flanges 13 at opposite ends each flange forming half of a crank cheek and preferably having its outer portion reduced in diameter as at 14 to provide a suitable recess for weld material as will be later explained.

Each end shaft member 11 may be provided with an enlarged end portion 15 having a flange 16 forming one-half of a crank cheek. The flange 16 may also be recessed as at 17 to receive weld material.

The spools 10 and shaft members 11 may both be machined on the ordinary engine lathe, such as is commonly used by manufacturers of machinery.

The various parts thus formed or any portion of them, depending upon the particular type of crankshaft to be produced and the purpose for which it is to be used, may be hardened or tempered by any suitable heat treatment.

The particular crankshaft illustrated in the drawing is intended for use in a pump operating under high pressure, and comprises three crank throws and only two main journals one of which is located at each end portion of the crankshaft.

To this end three spools 10 are formed and provide three crank pins connected together end to end as will be later described, with no intermediate main journals.

The two end shaft members 11 are connected to opposite ends of the crankshaft and provide the main journal at each end thereof.

It will be obvious that where a greater number of crank throws is required the number of spools 10 will be increased, and where main journals are required intermediate the crank throws additional spools 10 axially aligned with the end shaft members 11 may be interposed between the crank throws to provide main journals where desired.

In forming the crankshaft illustrated, the spools 10 should be made from steel suitable for carburizing and hardening to form inner race surfaces for roller bearings. These spools after being formed are therefore put through a carburizing process to prepare them for hardening, after which they are hardened to approximately 500 Brinell and to $\frac{3}{32}$" deep. This carburizing and hardening of the separate spools may be done with small equipment such as is usually available in the average machinery manufacturing plant.

The end shaft members 11 are made from large enough diameter stock that the built up crankshaft may be centered on the three crank throws and the end sections turned down to their specified diameters at a later operation, the centers for the main axis of the crankshaft being located in the ends of these end sections.

The material of which the end shaft members 11 for this particular crankshaft are made is not selected for heat treatment since the inner race for a roller bearing is pressed on the shaft. It will of course be understood that in different types of crankshafts for other applications other material may be used for the end shaft members where hardening or heat treatment may be desired.

The hardened spools 10 and the end shaft members 11 are next assembled and clamped in a jig which firmly holds the parts accurately in the requisite positions.

The several parts are then joined together by welding the opposed faces of the cams to each other. This may be accomplished by using welding material as indicated at 18 around the overlapping portions of the flanges as shown in Fig. 1, the welding material being received within the recesses 14 and 17 of the flanges and securely joining the parts together to form an integral crankshaft.

The large diameter end faces of the flanges provide for a maximum amount of applied welding material and lower the unit stress on the section when in use. Each opposed pair of flanges are thus firmly secured together forming a crank cheek.

During the welding operation a cooling system is applied to the hardened bearing surfaces of the spools 12 to conduct away the welding heat, which would otherwise destroy the hardness and distort the axis of the crank. Small, inexpensive equipment may be used for this purpose also.

After the welding operation is completed the crankshaft is mounted in an ordinary engine lathe and centers for the main axis are made in the end sections 11. When these centers have been established the end sections are turned to finish dimensions on these centers, using an ordinary lathe. The enlarged portions 15 of the end sections form the main journals of the crankshaft.

These end sections are then ground on the same main axis centers after which blocks having the three necessary centers for the crank throws are applied to the shaft ends 11 and the pins 12 are ground upon these centers, using ordinary grinding equipment. Of course if machines are available for grinding all surfaces at once the crankshaft may be ground thereon.

From the above it will be obvious that a simple, inexpensive crankshaft is produced which may be manufactured in any machine shop without having to depend on outside sources of supply including expensive dies, costly forging labor and uncertain delivery.

The separate small parts going to make up the built up crankshaft may be easily and readily machined on small and ordinary machinery, or on automatic machines before the complete crankshaft is welded into larger form, and no special equipment is required. The hardening operation may be performed upon the separate pieces before they are joined together and can be accomplished in small furnaces such as are commonly in use.

The initial as well as the final machining may be handled in the ordinary machine shop, whereas, with a one-piece crankshaft the small manufacturer who cannot machine the various crank throws at the same time with one setting must establish permanent centers on the crankshaft which is not always convenient, or must use removable centers which are difficult to remove and replace accurately during the machining and grinding operations.

From the above it will be evident the crankshaft disclosed herein may be readily and economically constructed from a plurality of simple parts, which are hardened and all machined except for the final finish grinding of the crank throws, before the parts are welded together in an assembly to form the completed crankshaft, the individual parts being finished very close to the desired final dimensions, so that by assembling and welding in an accurate jig it is only necessary to remove a very small amount of material in the final grinding operation upon the crank pins.

We claim:

1. A built up crankshaft comprising a plurality of similar, integral, machined spools, each spool comprising one complete crank pin with concentric, circular flanges at its ends, said spools being jointed end to end in axially unaligned position with the opposed flanges of adjacent spools eccentrically abutting and joined together forming crank cheeks between the pins.

2. A built up crankshaft comprising a plurality of similar, integral, machined spools, each spool comprising one complete crank pin with concentric, circular flanges at its ends, and two similar, integral, machined shaft members each having a concentric, circular flange at one end, said spools being joined end to end in axially unaligned position with the opposed flanges of adjacent spools eccentrically abutting and joined together forming crank cheeks between the pins, the flanges upon said shaft members eccentrically abutting and joined to the endmost flanges upon the spools forming crank cheeks between the endmost pins and the shaft members.

3. A built up crankshaft comprising a plurality of similar, integral, machined tempered spools, each spool comprising one complete crank pin with concentric, circular flanges at its ends, and two similar, integral, machined untempered shaft members each having a concentric, circular flange at one end, said spools being joined end to end in axially unaligned position with the opposed flanges of adjacent spools eccentrically abutting and joined together forming crank cheeks between the pins, the flanges upon said shaft members eccentrically abutting and joined to the endmost flanges upon the spools forming crank cheeks between the endmost pins and the shaft members.

4. A built up crankshaft comprising a plurality of similar, integral, machined spools, each spool comprising one complete crank pin with concentric, circular flanges at its ends, each flange having a peripheral recess in its outer face, said spools being joined end to end in axially unaligned position with the opposed flanges of adjacent spools eccentrically abutting and joined together forming crank cheeks between the pins and weld material positioned around adjoining flanges and located in said recesses.

5. A built up crankshaft comprising a plurality of similar, integral, machined spools, each spool comprising one complete crank pin with concentric, circular flanges at its ends, and two similar, integral, machined shaft members each having a concentric, circular flange at one end, said spools being joined end to end in axially unaligned position with the opposed flanges of adjacent spools eccentrically abutting and joined together forming crank cheeks between the pins, the flanges upon said shaft members eccentrically abutting and joined to the endmost flanges upon the spools forming crank pins between the endmost pins and the shaft members, each of the flanges upon the spools and shaft members having a peripheral recess in its outer face, and weld material positioned around adjoining flanges and located in said recesses.

6. A built up crankshaft comprising a plurality of similar, integral, machined spools, each spool comprising one complete crank pin with concentric, circular flanges at its ends, said spools being joined end to end in axially unaligned position with the opposed flanges or adjacent spools eccentrically abutting and joined together forming crank cheeks between the pins, the diameter of each flange being considerably less than the length of the crank cheek of which said flange forms a part.

KARL L. FINLEY.
DONALD D. SMITH.

CERTIFICATE OF CORRECTION.

Patent No. 2,337,157. December 21, 1943.

KARL L. FINLEY, ET AL.

It is hereby certified that error appears in the printed specification of the above numbered patent requiring correction as follows: Page 1, second column, line 38, for "th eparts" read --the parts--; page 2, second column, line 71, for "jointed" read --joined--; page 3, second column, line 28, for "flanges or" read --flanges of--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.